United States Patent
Luukkala et al.

(10) Patent No.: US 7,249,502 B2
(45) Date of Patent: Jul. 31, 2007

(54) PRECIPITATION/HAIL SENSOR AND METHOD FOR PRECIPITATION RATE MEASUREMENT

(75) Inventors: Mauri Luukkala, deceased, late of Espoo (FI); by Riitta Luukkala, legal representative, Espoo (FI); Atte Salmi, Porvoo (FI); Jouni Ikonen, Helsinki (FI); Jan Lönnqvist, Espoo (FI); Heikki Turtiainen, Vantaa (FI)

(73) Assignee: Vaisala Oyj, Helsinki (FI)

( * ) Notice: Subject to any disclaimer, the term of this patent is extended or adjusted under 35 U.S.C. 154(b) by 0 days.

(21) Appl. No.: 10/488,875

(22) PCT Filed: Sep. 23, 2002

(86) PCT No.: PCT/FI02/00760
§ 371 (c)(1),
(2), (4) Date: Nov. 29, 2004

(87) PCT Pub. No.: WO03/027720
PCT Pub. Date: Apr. 3, 2003

(65) Prior Publication Data
US 2005/0174720 A1 Aug. 11, 2005

(30) Foreign Application Priority Data
Sep. 24, 2001 (FI) ................... 20011876

(51) Int. Cl.
*G01W 1/00* (2006.01)
(52) U.S. Cl. ................ 73/170.17; 73/170.16
(58) Field of Classification Search ............. 73/170.17, 73/170.16
See application file for complete search history.

(56) References Cited

U.S. PATENT DOCUMENTS

| | | | |
|---|---|---|---|
| 4,665,744 A | 5/1987 | Smith | |
| 5,125,268 A * | 6/1992 | Caron | .................... 73/170.17 |
| 5,192,938 A * | 3/1993 | Ort | .............................. 338/5 |
| 5,203,207 A * | 4/1993 | Sugiyama | ................ 73/170.17 |
| 5,421,198 A | 6/1995 | More, III et al. | |

FOREIGN PATENT DOCUMENTS

| | | |
|---|---|---|
| DE | 44 34 432 A1 | 3/1996 |
| EP | 0 360 892 A1 | 4/1990 |
| EP | 0 422 553 A1 | 4/1991 |
| EP | 1 083 423 A2 | 3/2001 |
| FR | 2 595 473 A1 | 9/1987 |
| JP | 9-101377 A | 4/1997 |

* cited by examiner

*Primary Examiner*—Andre J. Allen
(74) *Attorney, Agent, or Firm*—Birch, Stewart, Kolasch & Birch, LLP

(57) ABSTRACT

The invention relates to a precipitation detector (1) and method for measurement of precipitation parameters. The detector (1) includes a frame (5), a surface (2) mounted on the frame (5) and adapted to receive hydrometeors, and detection means (3) for converting the impact impulses of hydrometeors into an electric signal. According to the invention, the surface (2) receiving the impact of the hydrometeors is convex, stiff and rigidly connected to the detector frame (4) with the detection means (3) being permanently connected to the surface (2) receiving the impact of the hydrometeors.

22 Claims, 6 Drawing Sheets

PRECIPITATION/HAIL SENSOR AND METHOD FOR PRECIPITATION RATE MEASUREMENT

The invention relates to a precipitation/hail detector according to the preamble of claim 1.

The invention also relates to a method for precipitation rate measurement.

Rain detectors conventionally used in the art can be categorized in two groups:

1) Collector-type rain gauges in which rainwater is collected into a collection vessel and the amount of water accumulated therein is measured by weighing the mass of the collected rainwater or by detecting the level of collected rainwater.
2) Precipitation rate type detectors comprising a funnel-like collector with a small-volume vessel placed thereunder. The vessel is arranged to empty itself automatically when a predetermined amount of water is accumulated therein (the simplest implementation being a tipping-bucket mechanism). The detector delivers a count pulse every time the bucket empties itself, whereby one pulse is calibrated to represent a predetermined amount of rain, e.g., 0.1 mm.

These types of precipitation rate rain detectors are hampered by the following problems:

The emptying of the collection vessel causes additional manwork (in manual emptying) or dead time in the measurement cycle (in automatic emptying).

The collection vessel or funnel also easily catches dirt requiring scheduled cleaning of the vessel or funnel.

Adherence of rainwater on the rims of the collection vessel and/or evaporation of rainwater from the collecting vessel cause significant measurement errors.

Moving parts of the rain detector may jam due to soiling or, e.g., insects entering the detector structures.

Whilst operating on a different principle, a piece of equipment called the distrometer may also be used for measuring precipitation rate. Distrometer is a device capable of measuring the droplet size distribution in precipitation. This kind of mechanical distrometer (so-called Joss-Waldvogel rainfall distrometer) includes a conical detector plate that is springedly supported on the device frame so that droplets falling thereon can deflect the plate from its equilibrium position. The movement of the detector plate is measured inductively by a sensor coil. Voltage pulses generated in the sensor coil due to the raindrop impacts are registered and, on the basis of pulse magnitude and empirical calibration coefficients, the masses and size distribution of individual droplets are computed. The raindrop distribution function may further be analyzed to compute the intensity and accumulative total amount of precipitation. Due to its expensive and complicated construction a distrometer is not generally used as all-round rain detector, but rather, only in meteorological research for measuring the size distribution of raindrops. The complex structure of the system is chiefly due to the springed mounting of the conical detector plate to the distrometer frame and awkward measurement method dictated by this clumsy mechanical construction with its force feedback arrangement.

Internet page document http://www.sensit.com/rain.htm describes a device for measuring the kinetic energy of raindrops. This measurement device has two pulse outputs that indicate:

1) the number of raindrops (output pulse is delivered if the detected energy signal exceeds a predetermined limit value) and
2) the kinetic energy of raindrops computed by integrating the output signal of the piezoelectric sensor of the device.

Either one of these variables is dependent on both the mass and the velocity of the rain drop thus not being directly suitable for use as a rainfall rate indicator. Furthermore, the above-mentioned device does not incorporate any computational intelligence inasmuch as it is implemented using discrete components alone.

It is an object of the present invention to provide a novel type of rain detector capable of overcoming the problems of the prior-art technology described in the foregoing.

The invention is based on the concept of detecting rainfall and its type by means of an acceleration or force sensor that is rigidly mounted on the device case. Respectively, the method according to the invention is based on analyzing the output signal obtained from the force sensor as to the shape of output signal pulse generated by each raindrop or hail particle individually thus being capable of determining the volume of the impinging raindrop or counting the number of raindrops per time unit or, alternatively, categorizing the rainfall as hails. The total amount and intensity of rain is then determined from the measurement data of the individual raindrops or counted number of raindrop impacts per time unit. The computational algorithm disclosed herein may be carried out using only the raindrop count data or only the data representing the raindrop size parameter values or both.

Furthermore, also the raindrop size distribution may be determined from the measurement data recorded individually for each raindrop.

According to the invention, wind-related error in the amount and intensity of rain may be corrected with the help of a separate wind error correction algorithm.

The invention is further characterized in that one or more characteristic parameters, which is/are dependent on the size of one or more raindrops in the signal representing the overall amount of raindrops and/or a single raindrop, is/are used for compiling a signal parameter that is proportional to the total volume of the detected raindrops, whereby the summing of the latter signal parameter values makes it possible to compute the total amount and intensity of detected rainfall.

According to a preferred embodiment of the invention, the parameter computation is integrated with the detector construction so that its output signal is directly proportional to the total amount and/or intensity of precipitation.

More specifically, the precipitation detector according to the invention is characterized by what is stated in the characterizing part of claim 1.

Furthermore, the method according to the invention is characterized by what is stated in the characterizing part of claim 11.

The invention offers significant benefits.

Firstly, the precipitation detector according to the invention is free from any moving parts. In its basic version, the detector has no collection vessel or funnel needing emptying or cleaning, no clogging parts or propensity to error due to adherence or evaporation of collected rainwater. Whilst operating in the same principle as a mechanical distrometer, the detector features a very simple and cost efficient construction.

Secondly, the detector according to the invention uses only a single sensor system to detect, not only the total amount of rainfall, but also rainfall intensity and to identify hails in precipitation.

A preferred embodiment of the invention facilitates compensation of measurement errors due to wind In the following, the invention will be examined with the help of exemplifying embodiments illustrated in the appended drawings in which FIG. 1 is an exploded view of a detector according to the invention;

FIG. 2b is a longitudinally sectional top view of the detector embodiment of FIG. 2a;

As mentioned above, the invention relates to the measurement of total amount of precipitation, distribution of hydrometeor size and intensity of precipitation. Next, the definitions of these variables are given below.

Total Amount of Rainfall (also called the cumulative rainfall)

Vertical height of rainfall column on a flat-bottom vessel. Standard unit is mm.

Rainfall Intensity

Total amount of rainfall per time unit. Standard unit is mm/h.

Raindrop Size Distribution

Number of raindrops in a given droplet size fraction suspended in unit volume of air.

Accordingly, the goal in the measurement of total amount of rainfall is to determine the total volume of raindrops detected per horizontal unit area.

Prior-art measurement technique of kinetic energy of raindrops is based on summing the kinetic energies $E=\frac{1}{2} m v^2$ of the individual raindrops.

Figure 1:
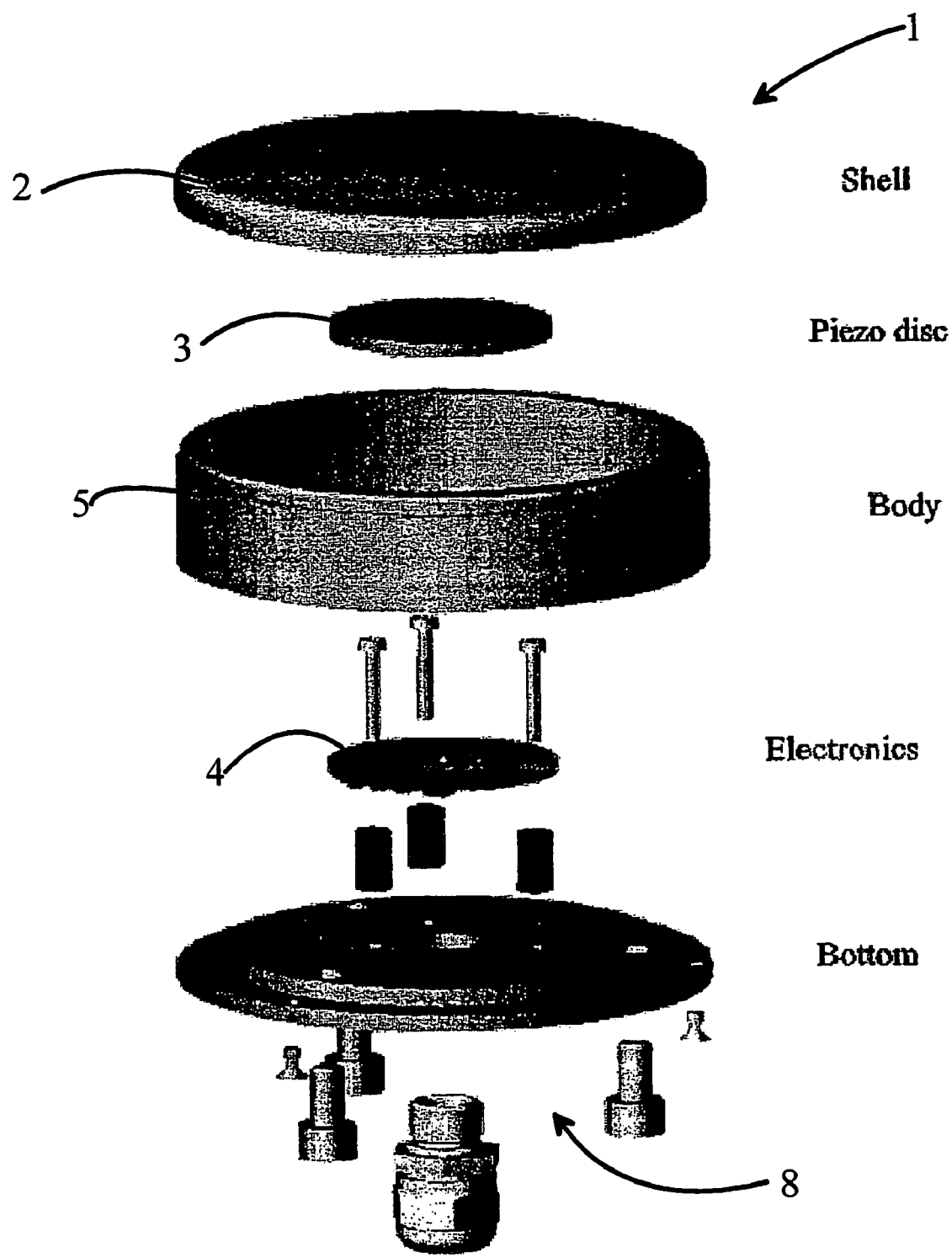

Now referring to FIG. 1, the precipitation detector 1 shown therein comprises a detector surface 2 whereon hydrometeors such as raindrops and/or hails impinge, a detector 3 serving to detect the energy pulses of raindrops impinging on the detector surface 2, complemented with measurement electronic circuitry 4 and a computational algorithm that in combination are capable of computing rainfall intensity (mm/h) and cumulative rainfall (mm).

The detector surface 2, which acts as the impact-receiving surface for the falling raindrops, is stiff and mounted on the detector case 5. Mounting may be made entirely rigid or implemented with the help of an O-ring or the like resilient mounting adapter component Typically, detector 3 is rigidly mounted on the detector surface 2. Computation utilizes information recorded on the number of registered raindrop pulses and/or some other parameter of the detector output pulse known to be dependent on the size of the impinging raindrop, such as the pulse amplitude or the full-width at half maximum (FWHM) value of the pulse or a combination of both.

The detector surface 2 is made planar, plate-like or convex (domed) and shaped so that accumulation of water thereon is impossible. To make the mounting of detector 3 easier, its mounting area on the detector surface 2 may be shaped planar. As a rule of design, the larger the area of the detector surface the greater the number of raindrops impinging thereon and, hence, the smaller the statistical error in the computed value of cumulative rainfall. On the other hand, a large area of the detector surface means that the number of raindrop impacts coinciding with each other increases which means problems in the interpretation of the measured signals. In practice, a good compromise for the detector surface area has been found to be 20 to 150 $cm^2$. The detector may also be comprised of multiple units, each one of them equipped with an individual detector assembly.

Detector 3 senses the deformation caused by the impinging raindrops on the detector surface. In a practicable construction, detector 3 may be implemented using, e.g.,:

a force or acceleration sensor attached to the detector surface, or a pressure-sensitive film covering the detector surface, such as piezoelectric PVDF polymer film or a layer of piezoelectric ceramic material.

In an ideal case, the response of the system combination of the detector surface with the detector is such that the output pulse amplitude and waveform are independent from the location of the raindrop impingement point, whereby the detector surface is homogenous. This is not crucial to the system function, because a nonuniform response only causes a random error in the measurement signal that can be eliminated by using a sufficiently long integration time.

The computation of cumulative rainfall and intensity thereof on the basis of the signal information recorded for the individual pulses can be implemented in plural different ways. Whilst the simplest technique is to count the number of raindrops only, the accuracy and reliability of detector response can be improved by way of additionally utilizing other information conveyed in the waveform of the detector output pulses (e.g., pulse amplitude or the half maximum pulse width). Herein, computation is advantageously carried out with the help of digital signal processing techniques and a microprocessor.

Figure 2A:
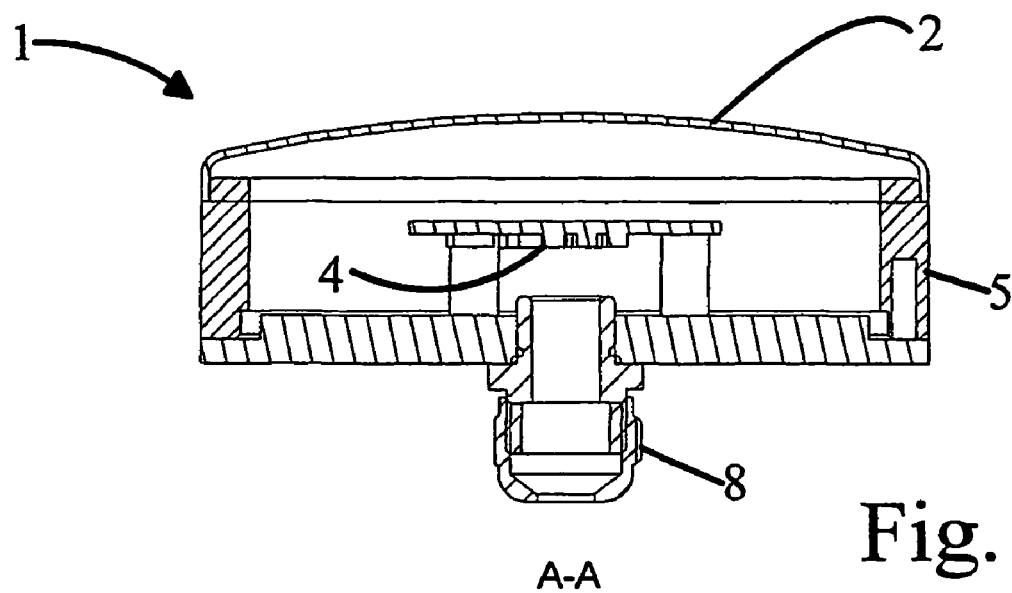
FIG. 2a is a longitudinally sectional side elevation view of a second embodiment of a detector according to the invention.
Figure 2B:
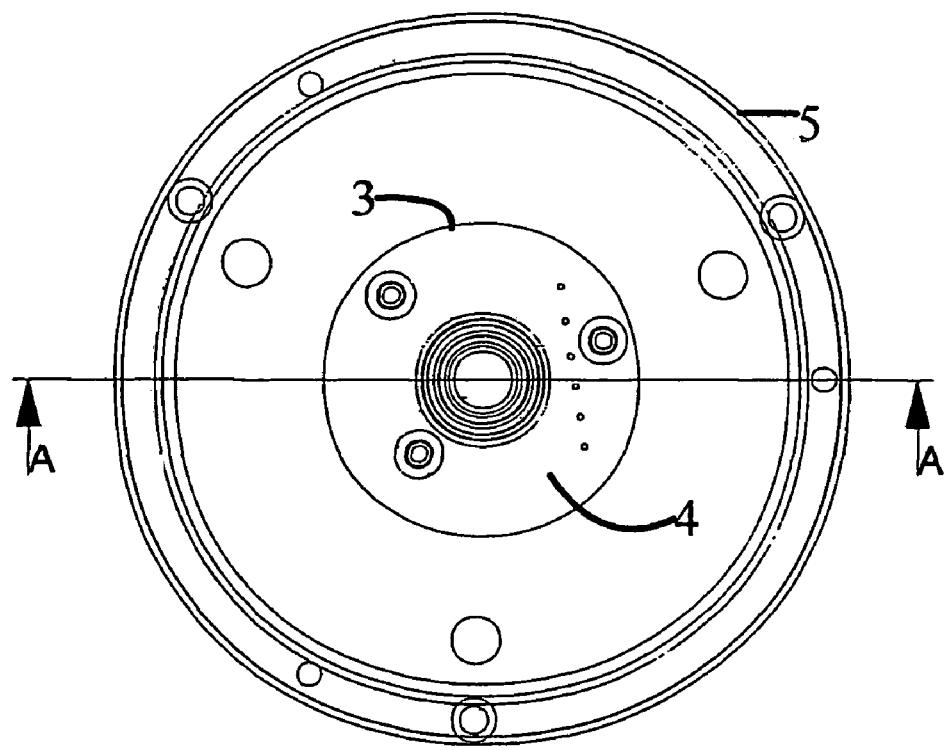

In FIGS. 2a and 2b is shown an alternative embodiment of detector 1 of FIG. 1. The detector 1 is constructed into a cylindrical case, whose cover 2 is a slightly convex metal disc acting as the detector surface made from, e.g., 1 mm thick stainless sheet steel. The cover 2 is rigidly connected at its rim centrally on the detector case 5 and further has mounted by glueing or soldering on its underside a piezoelectric ceramic element 3. The piezoelectric element is a disc made from a piezoelectric ceramic material that is metallized on its both sides so that its two contact electrode areas are located on the opposite sides of the disc-like element In this application the piezo-electric element 3 acts as a force sensor detecting the impacts of hydrometeors. The electrodes of piezoelectric element 3 are connected to an electronic amplifier 4 that is located in the interior of the detector case. The amplified measurement signal is taken to the computing means over a cable passing through the bottom 8 of the detector case. Alternatively, the entire measurement and computing electronics circuitry may be fitted into the device case, whereby the detector output can be a digital or an analog signal representing the cumulative rainfall and/or the intensity of rainfall.

Figure 3:
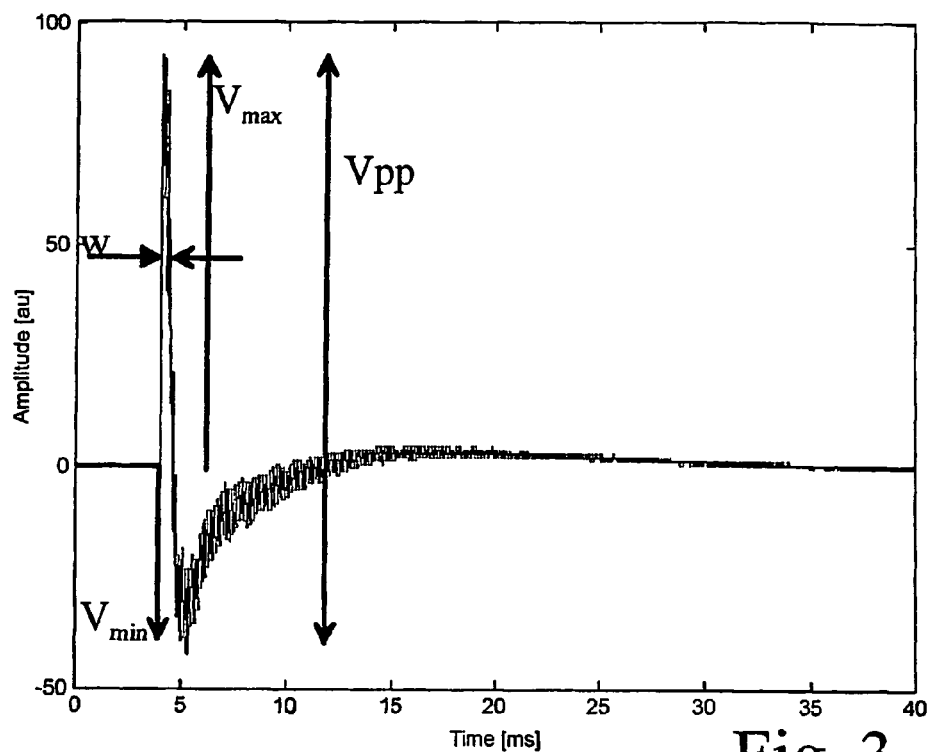
FIG. 3 is a graph illustrating the impulse of a falling raindrop in a system according to the invention.

When hitting the detector surface 2, the raindrop inflicts thereon a force that is further transmitted to the piezoelectric element 3 and is subsequently identified as a voltage pulse generated over the element. The material and dimensions of detector cover 2 are selected such that the resonant vibration evoked by the impacting raindrop is attenuated rapidly. In this construction, the waveform of the output pulse is as shown in FIG. 3.

The voltage pulses delivered by piezoelectric element 3 are filtered, amplified and analyzed as to their selected parameters related to the raindrop size before storage in the memory of the processor system performing final computations.

A number of different techniques can be used for computing rainfall intensity and cumulative rainfall from the gathered measurement data.

Next, two feasible methods are described.

Method 1

Computation is carried out using a fixed measurement cycle time increment, typically selected to be in the range 1-10 minutes. Output pulses detected during the measurement cycle are analyzed for parameters $x_j$ (which may include the full-width at half maximum value of the pulse ($w_{1/2}$), the peak-to-peak voltage ($V_{pp}$), the overall number of pulses or any other parameter characterizing the output pulse, or a combination of the selected parameters) and the analyzed values are stored in the processor memory. At the end of each measurement cycle, an estimate on the incremental value $\Delta P$ of cumulative rainfall detected over the cycle may be computed using an equation:

$$\Delta P = f(m, x_{11}, \ldots, x_{1n}, x_{21}, \ldots, x_{2n}, \ldots x_{m1}, \ldots, x_{mn}) \quad (1)$$

where m = number of raindrops detected during a measurement cycle n = number of pulse-character zig parameters used in computation, and $x_{ij}$ = value of pulse parameter j in the output pulse detected for raindrop i.

The values of j may be selected, e.g., as follows: 1=half-maximum pulse width ($w_{1/2}$), 2=peak-to-peak voltage ($V_{pp}$), 3=number of pulses, 4=other parameter characteristic of the output pulse, 5=a combination of the aforementioned. The half-maximum pulse width value $w_{1/2}$ of the pulse refers to the full-width at half maximum (FWHM) value of a positive pulse waveform ($=\frac{1}{2} * V_{max}$).

Function f represents the experimentally determined dependence of the measured pulse parameters on the rainfall variables.

Cumulative rainfall P is obtained summing the incremental rainfall values of successively recorded measurement cycles. The average intensity R of rainfall during a measurement cycle can be computed from equation:

$$R = \Delta P / t \quad (2)$$

This method is particularly useful for simultaneous measurement of the amount and intensity of rainfall.

Method 2

In this method, computation is performed out in real time so that the process begins on the detection of the first raindrop. Each detected raindrop is analyzed for parameters $x_j$ (which may as shown in FIG. 3 be the half-maximum pulse width $w_{1/2}$, peak-to-peak voltage $V_{pp}$, peak voltage $V_{max}$, minimum voltage $V_{min}$, number of pulses or any other parameter characterizing the output pulse, or a combination of the selected parameters), whereupon the cumulative rainfall P is computed from equation:

$$P = \Sigma_i [f(\Delta t_i, x_{i1}, \ldots, x_{in})] \quad (3)$$

where index i=1,2, ... refers to the individual raindrops detected during the measurement cycle, $\Delta t_i$ is the time interval between the detected raindrop and the preceding one, and function f represents the experimentally determined dependence of the measured pulse parameters on the raindrop volume.

This method makes it easy to implement a detector with a pulse output wherefrom a single pulse is delivered at the instant the amount of cumulative rainfall has grown large enough to exceed a predetermined threshold. Then, the detector output is identical to prior-art rain detectors of the tipping-bucket type, whereby it can be connected directly to data collection equipment most commonly used in weather station installations.

Figure 4:
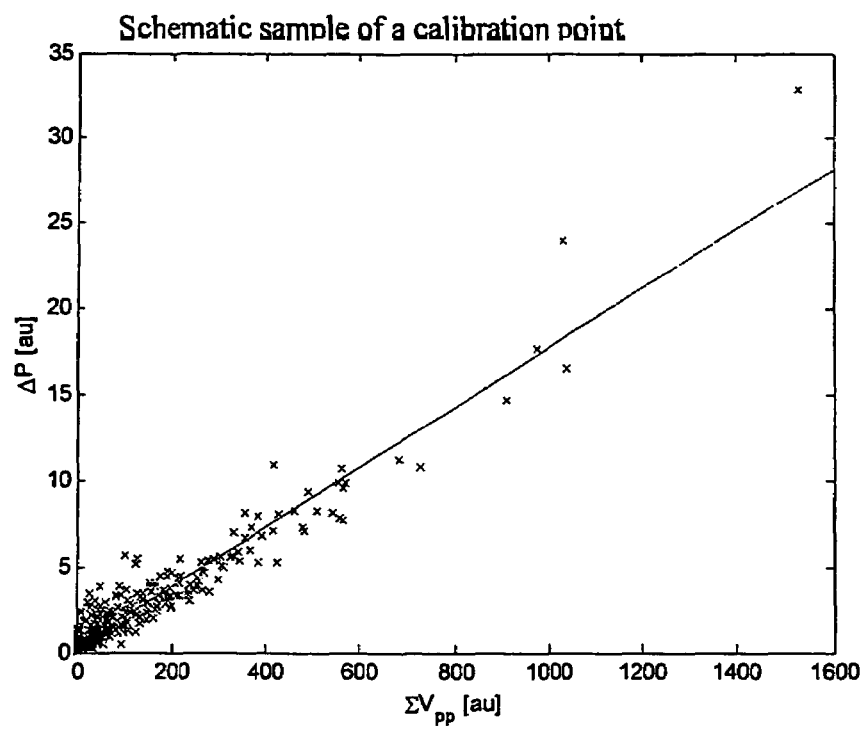
FIG. 4 is a plot illustrating a calibration curve used in the invention.

The accuracy of the rain detector and the computational method described above is crucially dependent on the detector calibration accuracy. The calibration parameters, that is, the constants in Eqs. (1) and (3) are determined experimentally by comparing the detector response with an accurate reference detector under laboratory or actual field conditions using regression analysis tools, for instance. An example of such calibration data is shown in FIG. 4.

Detection of hails is important on airfields, for instance. A prior-art device for this purpose is a hail detector comprising a metal plate with a microphone placed thereunder. Hails are identified by the impingement sound they create. This type of hail detector is hampered by its sensitivity to ambient noise making it suitable for use only as complementary detector in optical measurement systems of ambient weather conditions as is described in U.S. Pat. No. 5,528,224.

Next, a method is described suited for hail detection in a more reliable fashion and with reduced sensitivity to ambient noise. Hail detection may be incorporated as a supplementary feature to the above-described rain detector or, alternatively, it may be utilized in the construction of a detector intended for hail detection alone.

Figure 5:
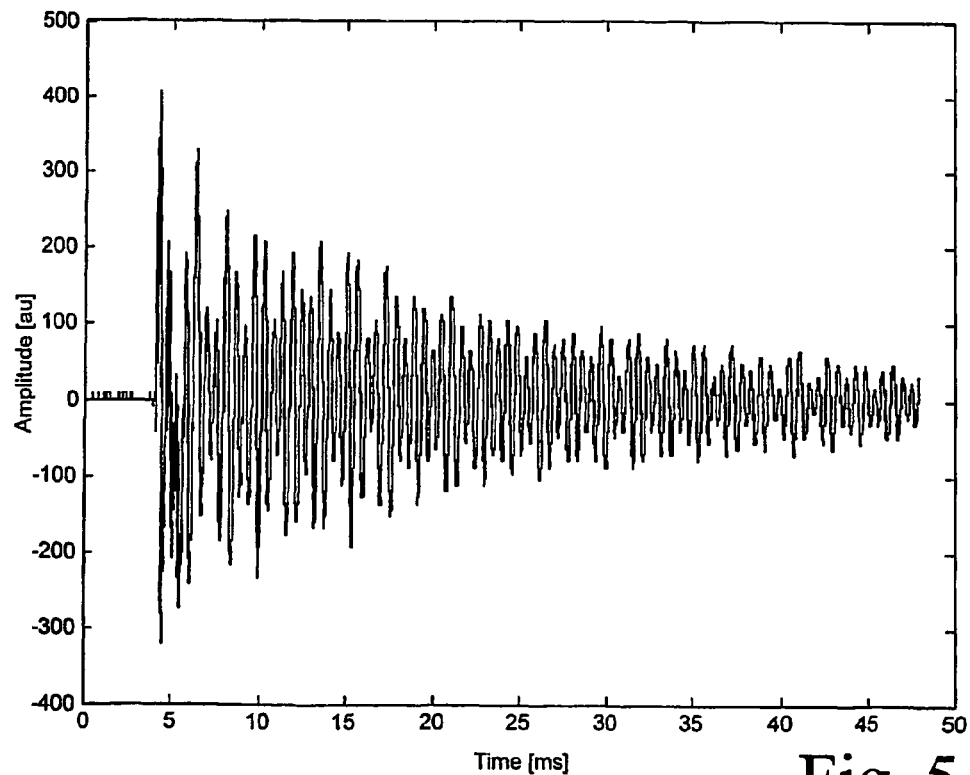
FIG. 5 is a graph illustrating the impulse of a falling hail in a system according to the invention.

Distinguishing hails from raindrops is based on the fact that the detector signals they produce are very different from each other. The impact of a solid object such as a hail on the detector surface is elastic, whereby firstly the rate-of-rise of the output pulse is faster and, secondly, the pulse amplitude is higher than in a pulse generated by a raindrop. The third difference is found in that the hail impact excites the resonant frequencies of the domed detector cover 2, whereupon the domed cover 2 continues vibrate after the impact. The differences between various hydrometeors become clearly evident by comparing the detector output pulse of FIG. 5 generated by a solid hydrometeor particle with the detector output pulse waveform of FIG. 3 generated by falling raindrop.

The above-described rain detector embodiment is not sensitive to air-borne noise inasmuch as the detector element, in contrast to a hail-sensing microphone, is not directly communicating with ambient air.

The identification of hails may thus be based on the detection of a selected characteristic parameter of the detector output signal, such as the amplitude, rise time or resonant frequency, or a combination of such parameters. By using a combination of plural such characterizing parameters, the reliability of measurements is increased and the number of false detection results due to ambient noise are reduced.

Wind is a significant error factor in rain measurements performed using unprotected detectors. Errors ranging from zero up to 30% have been reported in the art. The magnitude of the wind-related error is dependent on the wind velocity, rain intensity and type of precipitation.

There have been proposed in the art a number of different kinds of error correction methods for compensation of the wind-related error. In a system performing the measurement of rainfall and wind data simultaneously within a confined area, it is possible to reduce the effect of wind error on the measured value of rainfall intensity by applying a suitable correction algorithm.

However, all conventional systems utilize wind data that has been measured at a site clearly remote the site of rain data measurement. This is because wind data is typically measured at a height of some meters above the ground, while rain measurement typically takes place substantially at the ground level thus being removed by at least several meters from the wind sensor. Hence, the wind information to be utilized for wind-related error correction does not fully represent the actual wind condition at the rainfall measurement site. Furthermore, current methods do not operate in real time, but instead, information for wind error correction is obtained periodically delayed, typically being available in monthly, weekly, daily or 12-hour periods.

Therefore, next is explained a method according to the invention that is capable of overcoming the disadvantages of the prior art described above. The method is generally characterized by the steps outlined below.

For wind error correction, an algorithm is used capable using wind information gathered directly at the operating site of the rainfall detector or at least in a close vicinity thereof. In the context of this description, the term "close vicinity" must be understood to mean a distance of less than one meter from the rainfall detector. Advantageously, the distance is less than 30 cm, which means that the wind sensor may be readily integrated into one and the same measurement system.

The algorithm has a freely selectable time scale, whereby also real-time correction is possible.

The algorithm is suited for all rainfall sensor types irrespective of their operating principle.

A general form of the wind error correction factor is $$k = Rtr/R = f(w,R) \quad (4)$$

where Rtr is the actual amount of rainfall, k is the error correction factor, w is the wind velocity, R is the measured amount of rainfall and f is an experimentally determined function expressing the dependence of the error correction factor on wind velocity and rainfall intensity. The time scale of error correction is defined to be compatible with the time interval needed for computing the values of variables R and w in Eq. (4).

The corrected amount of rainfall is obtained by multiplying the measured amount of rainfall by correction factor k. The same correction technique can be employed in conjunction with other detector constructions, whereby the character of function f(w,R) may obviously vary.

In practice, the dependence of the error correction factor on the amount of rainfall R and wind velocity w expressed by function f(w,R) is determined experimentally by using two similar rainfall detectors. In the test arrangement, one these detectors is placed in a site maximally effectively protected from wind, whereby its reading represents an amount of rainfall Rtr uncorrupted by the wind error. Alternatively, the value of Rtr may be measured using a different type of rainfall detector protected from wind. The other rainfall detector is placed in a site subject to wind and, hence, its rainfall reading R is corrupted by a wind-related error. In a close vicinity of the latter rainfall detector is placed a wind sensor that measures the wind velocity w. As a result, function f(w,R) written in Eq. (4) can be determined from the thus gathered experimental data using nonlinear regression analysis methods, for instance.

Figure 6:
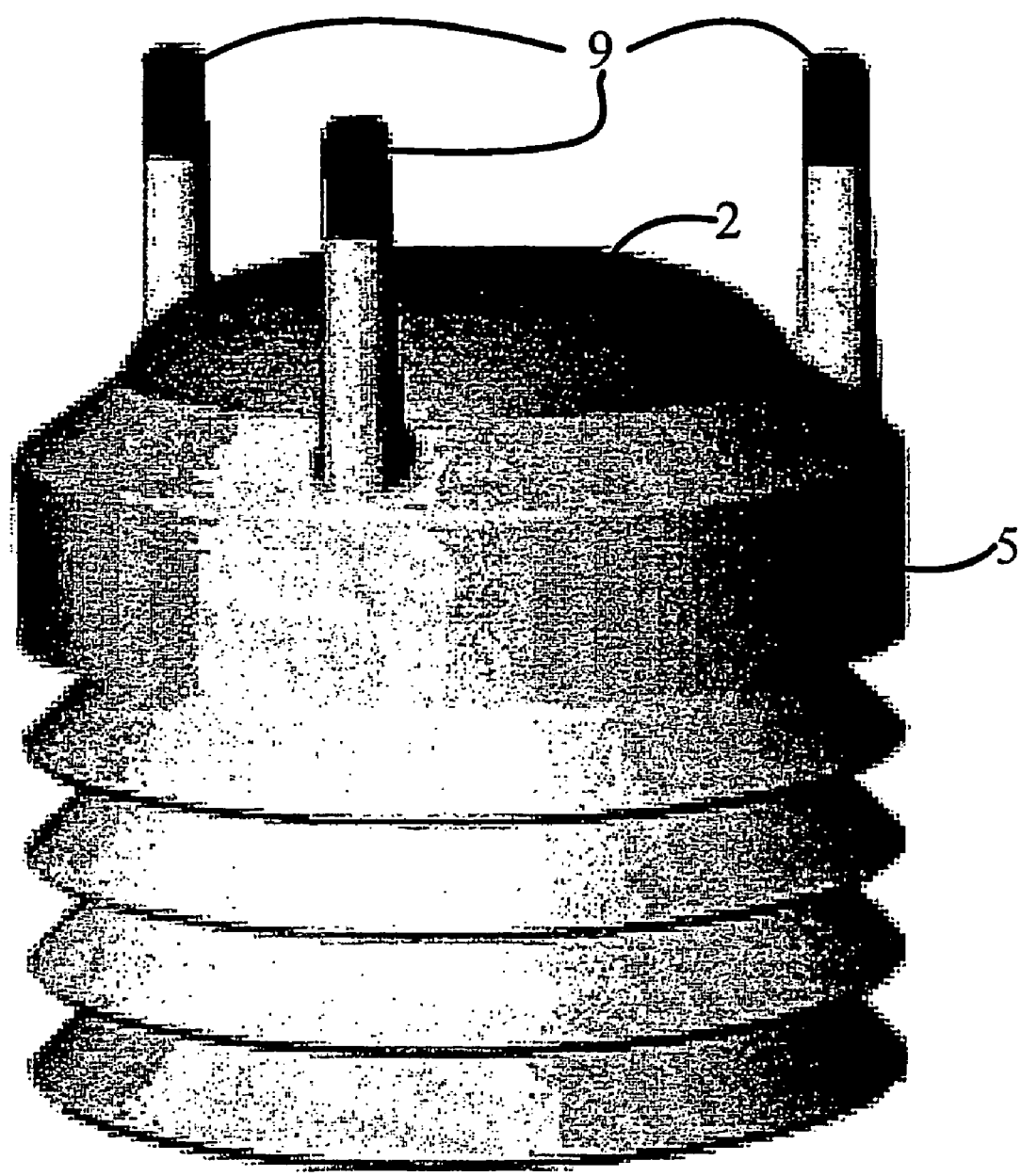
FIG. 6 is a view of a precipitation detector according to the invention equipped with a wind measurement device.

As illustrated in FIG. 6, the system comprises an ultrasonic wind velocity measurement system adapted about rainfall detector surface area. Typically, the system comprises three ultrasonic transmitter-receiver units 9 allowing the direction and strength of wind velocity to be determined on the basis of the sound propagation times between the ultrasonic transmitter-receiver units 9. This technology is described in more detail, e.g., in U.S. Pat. No. 5,343,744. Thus, this novel arrangement makes it possible to measure wind parameters practically in the same position with rainfall detection. In contrast, conventional weather stations have the rainfall detector located close to the ground level, while wind is measured at the height of several meters thus being remote in regard to the site of rainfall detection. Hence, the embodiment of the invention disclosed herein is characterized in that the sites of wind and rain measurements are located as close to each other as possible, whereby both of these weather variables are measured substantially in the same position. In lieu of the ultrasonic method, also other techniques may be employed for wind measurement, e.g., thermal methods based on sensing temperature at the distal ends of elongated elements that are aligned substantially vertically, whereby the end of the measuring element facing wind is typically at the lowest temperature.

Figure 7:
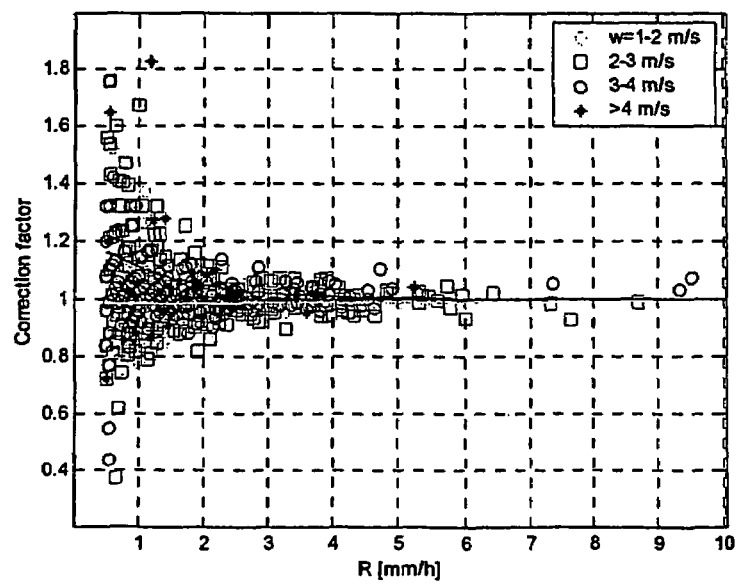
FIG. 7 is a graph illustrating the effect of wind on the precipitation measurement.

In FIG. 7 are shown correction factor curves for different wind velocity classes. Each data point represents the amount of rainfall collected during a 10-minute measurement cycle. The correction curves are then fitted on the experimentally gathered data using a nonlinear regression analysis method.

Figure 8:
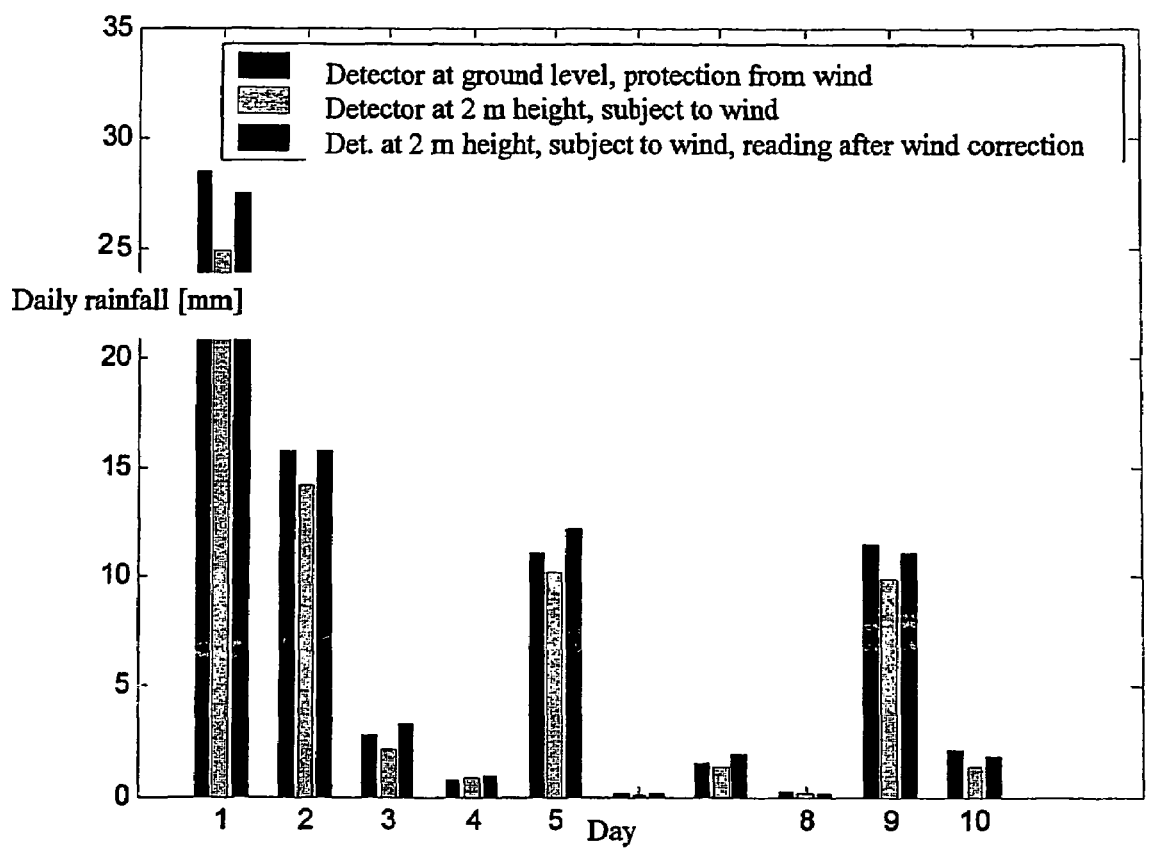
FIG. 8 is a graph illustrating the outcome of wind correction in the measurement results.

In FIG. 8 are shown respectively the corrected and uncorrected collective rainfall values for two rainfall detectors accumulated during a 10-day measurement period. The detectors used in the experiment were identical with the exception that one of them was mounted two meters above the ground thus being subjected to wind while the other one was located at the ground level in a site protected from the wind. As compared with the readings of the ground-level detector, the detector placed two meters above the ground was found to give readings in which the measured collective rainfall was systematically smaller due to wind-related error. Hence, the readings of the detector placed above ground need correction. Obviously, the correction algorithm discussed above can be used for improving the measurement accuracy of detectors mounted above the ground level.

The applications of the construction according to the invention may be further widened by complementing the system with a collecting-type rain detector. Herein, the system comprises two identical detectors, one of them having a collection funnel placed thereabove. The detector with the funnel could then provide rainfall information for low precipitation rates, too. This arrangement could also be employed for system self-diagnostics, whereby clogging of the funnel, for instance, may be recognized during periods of high precipitation rate as a smaller rainfall reading of the clogged detector.

The funnel may be designed heatable. Then, a detector equipped with a heated funnel during a snowfall can provide information on the actual precipitation rate and the water value of the snowfall.

What is claimed is:

1. A precipitation detector for measurement of precipitation parameters, the detector comprising:

a frame, a substantially stiff surface mounted on the frame and adapted to receive hydrometeors, and detection means for converting the impact impulses of hydrometeors into an electric signal, said surface receiving the impact of the hydrometeors being rigidly connected at its rim on the frame and the surface being at least partially convex, and said detection means being permanently connected to said surface receiving the impact of the hydrometeors.

2. The precipitation detector of claim 1, wherein in the immediate vicinity of the precipitation receiving surface is adapted a wind measurement system.

3. The precipitation detector of claim 1, wherein the number of sensors in said wind measurement system is three.

4. The precipitation detector of claim 1, wherein said sensors are ultrasonic sensors capable of measuring the propagation delay of sound.

5. The precipitation detector of claim 1, wherein said wind sensors are thermal wind velocity sensors.

6. The precipitation detector of claim 1, wherein said precipitation receiving surface is a domed stirface.

7. The precipitation detector of claim 1, wherein the top surface of said precipitation receiving surface is planar.

8. The precipitation detector of claim 1, wherein above said precipitation receiving surface is adapted to a collection means such as a funnel.

9. A precipitation detector system, further comprising two detectors of the kind disclosed in claim 1, one of the detectors being equipped with a precipitation collecting funnel.

10. The system of claim 9, wherein the precipitation collecting funnel is adapted to be heatable.

11. A method for measuring the parameters of precipitation, the method comprising the steps of measuring precipitation at the level of individual hydrometeors, counting the number of hydrometeors, compiling precipitation rate information from the measurement data collected at the level of individual hydrometeors that are recorded from the elastic deformation of a detector surface under the impacts of said individual hydrometeors, and the signal parameter information of the individual impacts or the number thereof per time unit is used in the determination of precipitation intensity, total amount of precipitation or analysis of hydrometeor size distribution in precipitation, wherein the hydrometeors are received by a surface which is rigidly connected at its rim on the flame and the surface is at least partially convex.

12. The method of claim 11, wherein each one of the individually recorded impact signals is processed to compile at least one parameter or a combination of parameters responsive to the size of said hydrometeor in order to determine the precipitation intensity, total amount of precipitation or hydrometeor size distribution in precipitation.

13. The method of claim 11, wherein said deformation detection means is constructed into a separate structure that is connected to the surface of the precipitation detector.

14. A method of measuring the parameters of precipitation, the method comprising the steps of measuring precipitation at the level of individual hydrometeors, and compiling precipitation rate information from the measurement data collected at the level of individual hydrometeors, wherein precipitation rate is measured utilizing the elastic deformation of a detector surface under the impact of hydrometeors, and categorization of hydrometeors into hails is based on the signal information related to the individual hydrometeors.

15. The method of claim 14, wherein the defonnation detections means is connected in an integrated fashion to the surface of the precipitation detector.

16. The method of claim 1, wherein wind is measured at least substantially in the same position with the precipitation rate measurement system.

17. The method of claim 1, wherein wind is measured using an ultrasonic technique.

18. The method of claim 1, wherein wind is measured using a thermal technique.

19. The method of claim 1, wherein precipitation is measured using an at least substantially similar detector equipped with a collecting funnel and the measurement result is obtained as a combination of the data recorded by both detectors.

20. A method for measuring the parameters of precipitation, the method serving to detect the precipitation intensity, total amount of precipitation or hydrometeor size distribution in precipitation, comprising the following steps:

measuring the wind at least substantially in the position with a precipitation measurement system; and correcting the detected value of precipitation intensity, total amount of precipitation or hydrometeor size distribution in precipitation on the basis of the measured wind velocity.

21. The method of claim 20, wherein said correction is made in real time.

22. The method of claim 20, wherein said precipitation measurement is performed using a precipitation detector, comprising;

a frame, a substantially stiff surface mounted on the flame and adapted to receive hydrometeors, and detection means for converting the impact impulses of hydrometeors into an electric signal, said surface receiving the impact of the hydrometeors being rigidly connected at its rim on the frame and the surface being at least partially convex, and said detection means being permanently connected to said surface receiving the impact of the hydrometeors.

* * * * *